(12) United States Patent
Li et al.

(10) Patent No.: US 10,953,486 B2
(45) Date of Patent: *Mar. 23, 2021

(54) ADDITIVE FORGING METHOD FOR PREPARING HOMOGENIZED FORGED PIECES

(71) Applicant: INSTITUTE OF METAL RESEARCH CHINESE ACADEMY OF SCIENCES, Shenyang (CN)

(72) Inventors: Dianzhong Li, Shenyang (CN); Mingyue Sun, Shenyang (CN); Bin Xu, Shenyang (CN); Longzhe Zhao, Shenyang (CN); Yiyi Li, Shenyang (CN)

(73) Assignee: INSTITUTE OF METAL RESEARCH ACADEMY OF SCIENCES, Shenyang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,776

(22) Filed: Jul. 18, 2019

(65) Prior Publication Data

US 2019/0366420 A1    Dec. 5, 2019

Related U.S. Application Data

(62) Division of application No. 15/561,358, filed as application No. PCT/CN2015/083018 on Jul. 1, 2015, now Pat. No. 10,413,964.

(30) Foreign Application Priority Data

Mar. 26, 2015   (CN) .......................... 201510134094.6

(51) Int. Cl.
  *B23K 15/00*   (2006.01)
  *B21D 39/00*   (2006.01)
  (Continued)

(52) U.S. Cl.
  CPC .............. *B23K 15/00* (2013.01); *B08B 1/006* (2013.01); *B08B 3/022* (2013.01); *B08B 7/00* (2013.01);
  (Continued)

(58) Field of Classification Search
  CPC ......... B21J 5/12; B21J 1/02; B21J 1/04; B21J 1/06; B21J 5/002; B21J 5/08;
  (Continued)

(56) References Cited

U.S. PATENT DOCUMENTS 5,273,202 A        12/1993 Douglas
10,413,964 B2 *    9/2019 Sun ........................ B23K 15/00
(Continued)

FOREIGN PATENT DOCUMENTS

CN        1503727        6/2004
CN        1593795 A      3/2005
(Continued)

OTHER PUBLICATIONS

International Search Report and Written Opinion, issued in the corresponding PCT application No. PCT/CN2015/083018, dated Jan. 12, 2016.

(Continued)

*Primary Examiner* — Jermie E Cozart
(74) *Attorney, Agent, or Firm* — Muncy, Geissler, Olds & Lowe, P.C.

(57) ABSTRACT

A constructing-and-forging method for preparing homogenized forged pieces comprises: preparing preformed billets: cutting off a plurality of continuous casting billets, milling and smoothing surfaces of the billets to be welded, performing vacuum plasma cleaning operation to the surfaces to be welded, stacking the plurality of billets and sealing around the surfaces in a vacuum chamber by electron beam welding; forge-welding and homogenizing the preformed billets:

(Continued)

heating the preformed billets to a certain temperature in a heating furnace and taking the heated preformed billets out of the heating furnace, forging the preformed billets by a hydraulic press, then using three-dimensional forging to disperse the welded surfaces such that composition, structure and inclusion of the interface areas are at the same level as those of the bodies of the billets. Cheap continuous casting billets are stacked and forge welded.

19 Claims, 3 Drawing Sheets

(51) Int. Cl.
*B08B 7/00* (2006.01)
*B21J 5/00* (2006.01)
*B23K 15/06* (2006.01)
*B08B 1/00* (2006.01)
*B21J 1/02* (2006.01)
*B21J 1/04* (2006.01)
*B21J 1/06* (2006.01)
*B21J 5/08* (2006.01)
*B23K 20/14* (2006.01)
*B23K 37/00* (2006.01)
*B23P 13/00* (2006.01)
*B23P 15/00* (2006.01)
*B08B 3/02* (2006.01)
*B08B 1/02* (2006.01)
*B23K 20/26* (2006.01)
*B23K 31/02* (2006.01)
*B65G 47/92* (2006.01)
*B65G 61/00* (2006.01)

(52) U.S. Cl.
CPC ............... *B21D 39/00* (2013.01); *B21J 1/02* (2013.01); *B21J 1/04* (2013.01); *B21J 1/06* (2013.01); *B21J 5/00* (2013.01); *B21J 5/002* (2013.01); *B21J 5/08* (2013.01); *B23K 15/06* (2013.01); *B23P 13/00* (2013.01); *B23P 15/00* (2013.01); *B08B 1/02* (2013.01); *B23K 15/0046* (2013.01); *B23K 20/14* (2013.01); *B23K 20/26* (2013.01); *B23K 31/02* (2013.01); *B23K 37/006* (2013.01); *B65G 47/92* (2013.01); *B65G 61/00* (2013.01); *Y10T 29/49968* (2015.01); *Y10T 29/49973* (2015.01); *Y10T 29/49975* (2015.01)

(58) Field of Classification Search
CPC .... B23K 15/06; B23K 20/14; B23K 15/0046; B21D 39/00; Y10T 29/49973; Y10T 29/49975; Y10T 29/49968; B08B 3/022
See application file for complete search history.

(56) References Cited

U.S. PATENT DOCUMENTS

2007/0209741 A1 9/2007 Carpenter et al.
2008/0220308 A1 9/2008 Kanbe et al.

FOREIGN PATENT DOCUMENTS

| CN | 101439348 | 5/2009 |
| CN | 102009332 | 4/2011 |
| CN | 102764961 A | 11/2012 |
| CN | 102837160 | 12/2012 |
| CN | 203711411 A | 7/2014 |

OTHER PUBLICATIONS

"Development of New Heavy-Gauge Steel Plate Using Cladding Technology", JFE Technical Report, No. 5, Mar. 2005, pp. 77-79.
Xie et al., "Effect of Rolling Parameters on Microstructure and Property of Vacuum Rolling Clad Steel Plate", Journal of Iron and Steel Research, vol. 23, No. 12, Dec. 2011, 4 pages.

* cited by examiner

ADDITIVE FORGING METHOD FOR PREPARING HOMOGENIZED FORGED PIECES

TECHNICAL FIELD

The present invention relates to the field of forging, and more particularly to a constructing-and-forging method which can be used to prepare homogenized forged pieces. Using the present invention, continuous casting billets can be stacked and forge-welded to make homogenized forged pieces.

DESCRIPTION OF THE RELATED ART

As the core components of large engineering equipment used in the fields of metallurgical machinery, petrochemical industry, transportation and energy power, forgings play an important role in national economy, national defense equipment and important scientific devices. The production capability and quality of forgings are important symbols to measure the independent ability and national strength of a country. Consequently, it is extremely important to improve inner quality of the forgings to ensure its safety and reliability during its operation.

Forgings are usually forged from ingots. There are always many inevitable microscopic shrinkage cavities and porosities in ingots caused by metal solidification shrinkage. These void defects disperse in the center of the ingot, destroy material's continuity and affect mechanical properties of the forgings. Meanwhile, because of the solute redistribution during solidification process, the last solidification zone in large ingot has higher alloy concentration and enrichment of low-melting and impurity elements. Thus, the macroscopic segregation is formed. It causes a big difference of mechanical properties between ingot head and tail, which seriously affects the homogeneity of the forging's property and its safety during service. Currently in industry, the head and tail of ingots are always cut off to reduce these bad effects. The cutting rate is over 30%, which reduces utilization rate of material greatly and leads to poor economic efficiency.

Continuously casted slab billet is one of the most stable and mature products in the iron and steel large scale production industry, whose manufacturing cost is low and production efficiency is high. When its dimension is smaller than a certain value (generally, the thickness of slab billet is 300 mm and the diameter of round billet is 600 mm), its internal structure is relatively dense and macroscopic segregation is slight. However, because of rapid solidification and no hot top feeding during casting, when the dimension of the continuous casting billet is larger than the mentioned certain value, the center of the billet is prone to have shrinkage cavities penetrating through the whole length. The shrinkage cavities would be oxidized after cutting and could not be healed in subsequent rolling or forging process, which limits application range of the billet. Thus, continuous casting billet cannot be used to make high quality forgings and mould casting ingots with higher cost are still used as the raw material.

In recent years, with the development of high-power electron beam generator, a kind of vacuum cladding rolling method has been proposed to manufacture heavy guage plate (ref: Development of new heavy gauge steel plate using cladding technology. JFE Technical Report, 2004, 5(8):65). In this method, plates of normal thickness are stacked together; the interfaces between the plates are sealed around by electron beam welding; then the plates are heated and rolled, so the heavy gauge plate can be got. Vacuum electron beam welding is used to protect the interface from severe pollution and high temperature oxidation. Metal is diffusion welded under high temperature during cladding rolling process, so multiple plates are connected together. This method solves the difficulty of manufacturing heavy gauge plates. Three key factors of diffusion welding are temperature, pressure and time. Even though the rolling process is under high temperature and high pressure, the pressure on the bonding interface only exists in an extremely short time due to the high rolling speed, so it is difficult to weld the bonding interface completely and make the interface the same as bodies of the billets. Compared with forging, rolling is characterized by single directional and small deformation, with the strain mainly distributing on billet surface and reaching the minimum value at the central part, which does harm to welding of the interface in the center. Reference (Effect of Rolling Parameters on Microstructure and Property of Vacuum Rolling Clad Steel Plate, Journal of Iron and Steel Research, 2011, 23(12) 27-30) has studied the effect of different rolling reduction ratio on interface welding. It is found that only when the rolling reduction ratio reaches 70%, Z directional tensile strength of the bonding interface can reach that of the bodies of the billets. This result suggests that the interface cannot be completely welded under small reduction ratio while the micro porosity and oxide layer still exist, which is fatal to material's mechanical properties and extremely unacceptable for components serving under alternating load. Hence, the heavy gauge plates produced by the vacuum cladding rolling method cannot be used under harsh serving conditions.

Compared with cladding rolling, forging as a traditional metal pressure processing method is inefficiency, but its deformation method is flexible, which makes large single deformation and multidirectional deformation possible. Before the industrial revolution, high quality metal devices, such as swords, were all produced by forging. Limited by the metallurgical technology at that time, forged pieces were produced from spongy iron. After repeated large deformation, inclusions in the material can be broken and decarburization can be achieved by surface extension and oxidation. After folding and forging for hundreds of times, the toughness and uniformity of the material could be improved. Swords produced by this forging method combine both high hardness and high toughness. Its processing technology and property is amazing. However, limited by the technological level at that time, interface pollution and oxidation could not be avoided during folding and forging. Thus, in order to achieve interface welding, the interface oxide layer must be broken and dispersed by many times of large deformation.

In recent years, a plasma cleaning technology has been developed in the field of surface cleaning area. High voltage alternating electric field is produced by radio frequency power source. It can vibrate oxygen, argon, hydrogen and other gases and produce ions with high reaction activity and high energy. Then the organic and particulate pollutants will change to volatile substances by reaction or collision with these ions and be cleaned out by gas flow and vacuum pump. Thus, the purpose of surface cleaning and activation can be achieved and this is the most thorough stripping cleaning method. Using this method, the deep cleaning into micro hole and depression on the billet surface can be achieved, which can effectively remove the oil contamination on the surface, increase the surface activity and improve the welding effect. Meanwhile, this method avoids the use of harmful solvents and will not produce harmful pollutants, which is good for environmental protection.

SUMMARY

Based on folding and forge-welding method of swords, plasma cleaning technology and vacuum electron beam welding technology, the present invention provides a constructing-and-forging method for preparing homogenized forged pieces. After surface machining and cleaning, several low-cost continuous casting billets are sealed and welded together by vacuum electron beam welding. Then forge-welding technology characterized by large deformation, pressure dwelling, and multidirectional forging is applied on the billet. The interfaces can be completely welded and dispersed. Finally, the composition, structure and inclusion level can reach that of the bodies of the billets.

The technical solutions of the present invention are:

A constructing-and-forging method for preparing homogenized forged pieces, characterized by:

firstly, preparing preformed billets: cutting off a plurality of continuous casting billets to have certain sizes, milling and smoothing surfaces of the billets to be welded by a milling planer, performing vacuum plasma cleaning operation to the surfaces to be welded, stacking the plurality of billets and sealing around the surfaces to be welded in a vacuum chamber by electron beam welding;

then forge-welding and homogenizing the preformed billets: heating the preformed billets to a certain temperature in a heating furnace and taking the heated preformed billets out of the heating furnace, forging the preformed billets by a hydraulic press, using pressure dwelling and temperature dwelling means during a first upsetting process to weld the surfaces completely together, then using three-dimensional forging to disperse the welded surfaces such that composition, structure and inclusion of the interface areas are at the same level as those of the bodies of the billets;

Final forming: forging the preformed billets to have final shape and size;

The specific steps of the method are as follows:

A first step, cutting off the plurality of the continuous casting billets according to a certain specification;

A second step, machining and cleaning the surfaces of the billets to be welded;

A third step, welding the billets by vacuum electron beam welding to seal the billets;

A fourth step, heating the billets before forging;

A fifth step, upsetting and forge-welding the billets using a pressure dwelling method;

A sixth step, diffusion bonded the billets under a high temperature;

A seventh step, stretching the billets in the Y direction;

An eighth step, stretching the billets in the X direction;

A ninth step, stretching the billets in the Z direction; and

A tenth step, forging the billets to have final shape and size.

The constructing-and-forging method for preparing homogenized forged pieces, wherein: in the first step, when cutting off the continuous casting billets, a width-to-length ratio of the billets is 2:3, and the number of continuous casting billets is determined such that a total height of the stacked billets versus the width is 2:1, thus, after stacking, the ratio of width(X):length(Y):height(Z) =2:3:4, so as to facilitate performing the three-dimensional forging.

The constructing-and-forging method for preparing homogenized forged pieces, wherein:

In the second step, the surfaces to be welded are processed by the milling planer and cleaned by a plasma in the vacuum chamber, so as to ensure high cleanliness of the surface and to expose fresh metal.

The constructing-and-forging method for preparing homogenized forged pieces, wherein:

In the third step, the stacked billets are placed in the vacuum chamber and interfaces between the billets are sealed around by electron beam welding, and a welding depth is 10~50 mm.

The constructing-and-forging method for preparing homogenized forged pieces, wherein:

In the fourth step, the sealed billets are sent to the heating furnace and a heating temperature is $0.85T_m$, wherein $T_m$ is the melting point of the material of the billets and the unit of $T_m$ is ° C.

The constructing-and-forging method for preparing homogenized forged pieces, wherein:

In the fifth step, placing the heated billets on an operation platform of the forging press and make the height direction of the billet vertical; upsetting the billets using an upsetting plate in the direction of height (Z direction); the upsetting is carried out in two steps: first, pressing the billets to reduce the total height of the billets by 10% and keep pressure on the billets for 5 min; then continuing the upsetting until the total height of the billets is reduced by 50%, and keeping pressure on the billets for 10min.

The constructing-and-forging method for preparing homogenized forged pieces, wherein: in the sixth step, the upset billet is sent back to the heating furnace and heated at a heating temperature of 0.85Tm, Tm is the melting point of the material of the billets and has a unit in ° C., and the heating temperature is kept for 20Th hours after the billets are uniformly heated, Th is the height after upsetting and has a unit in meters. The constructing-and-forging method for preparing homogenized forged pieces, wherein: in the seventh step, a flat anvil is used to stretch the billets in the Y direction and the billets are formed into a cuboid with a dimension ratio of width (X): length (Y): height (Z)=3:4:2.

The constructing-and-forging method for preparing homogenized forged pieces, wherein: in the eight step, upsetting the billets by 50% in the Y direction by a flat anvil, and after the billets are deformed to the certain dimension, stretching the billets in the X direction into a cuboid with a dimension ratio of width (X): length (Y): height (Z)=4:2:3.

The constructing-and-forging method for preparing homogenized forged pieces, wherein: in the ninth step, upsetting the billets by 50% in the X direction by a flat anvil, and after the billets are deformed to the certain dimension, stretching the billets in the Z direction into a cuboid with a dimension ratio of width (X): length (Y): height (Z)=2:3:4.

The physical metallurgical and mechanical analysis of the present invention is as follows:

After sealing and welding the edge of stacked continuous casting billets, the billets on both sides of each interface already contact each other macroscopically, but in fact due to the roughness of the billet surface, it is multipoint contacting between the billets microscopically. There are a large number of interspaces between the contact points, and these interspaces can be considered as voids.

Figure 1:
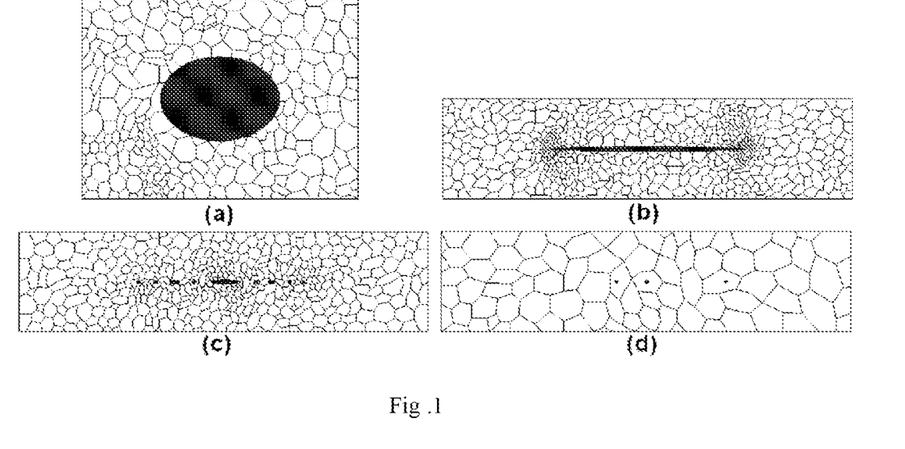
FIG. 1 shows the mechanism of interface defect's healing. It is included, (a) the initial deformation; (b) the void closing macroscopically; (c) crack defect becoming unstable and decomposing; (d) metallurgical bonding.

Taking one void for example, its evolution during upsetting forging process is analyzed: as shown in FIG. 1, (a) at the beginning of deformation, the void is crushed and grains are distorted; (b) the void is closed macroscopically, and becoming a crack defect. Recrystallization on the body occurs; (c) the crack defect is instable and decomposes into cylindrical or spherical micro voids; (d) with grain boundary migration and grain growth, the micro voids disappear gradually because of atomic diffusion, and metallurgical bonding between the two billets is achieved.

The healing process of void defects includes void closure and closed surface welding: void closure refers to the physical contact of the void's surface under the action of stress and strain; surface welding refers to that under a certain temperature, contact pressure and temperature holding time, the closed surface achieves metallurgical bonding through diffusion and recrystallization etc. Void closure is a prerequisite for surface welding. Forging is used to process the stacked and welded billets, and the strain of its central part is much greater than rolling. Surface welding is the key to realize a completely defects healing. Through experimental study, inventors found that the micro scale defects have been closed, but not welded, which would be easily open again under external force. Meanwhile, composition and microstructure between the welded interface and the body of the billet has a big difference. So a "bonding band" exists. This kind of "scar" structure can be totally eliminated after a long time of high temperature heat treatment.

Based on the considerations above, the present invention proposes the methods of "pressure dwelling during forging", "temperature dwelling between forging" and "multidirectional forging" to realize healing of the interface and homogenization of composition and structure. "Pressure dwelling during forging" can mostly guarantee welding of the two surfaces, and avoid the welded interface from opening again under external force; "temperature dwelling between forging" can ensure that the micro voids which still exist in microscopic scale during forging will be healed completely by diffusion at high temperature; "multidirectional forging" can guarantee that the welded interface is largely deformed in multiple directions, so that the residual oxide layer on interface can disperse into the body of the billet as much as possible, which can reduce its harm to mechanical properties. Combining the above methods together, the consistency between the interface and the body can be achieved to the greatest extent.

The present invention breaks through the traditional method that only mould casting ingot can be used to make large forgings. Using the method of forge-welding stacked continuous casting billets, the present invention combines the advantages of metallurgy industry and machinery industry. This method not only reduces the manufacturing cost, but also improves product quality. Meanwhile, the reduction of a large amount of mould casting ingot production can make significant contribution to energy saving and emission reduction.

The present invention has the following advantages and beneficial effects:

1. Homogenized manufacture of large section forgings can be achieved. Several continuous casting billets are stacked and forge-welded to make large forging, its composition uniformity is much better than that of mould casting ingot. Especially, the chemical composition at both ends of the forging is basically the same, but that of forgings made from mould casting ingot has a big difference.

2. Densification manufacture of large section forgings can be achieved. The structure of continuous casting billets used is relatively dense, and has no central porosity. After temperature dwelling, pressure dwelling and multidirectional forging, the compactness of welded interface is higher than the compactness of forgings made from mould casting ingot.

3. Purification manufacture of large section forgings can be achieved. When the continuous casting billets is produced in steel plants, the RH furnace is used for degassing, while the VD furnace is usually used for degassing mould casting ingots when the ingot is produced by machine plants. The degassing effect of RH furnace is better than that of VD furnace because of its circulation function. Therefore, the content of total oxygen in continuous casting billet is lower than that of mould casting ingot, and the inclusion level is relatively low. The forgings produced by stacked continuous casting billets forge-welding show a lower level of inclusion than forgings made from mould casting ingot.

4. Low cost manufacturing of large section forgings can be achieved. Because of the to using of continuous casting billets, the weight of the required billets can be calculated accurately. When the mould casting ingot is used to make a forging, 20% to 30% of the material will be wasted because of cutting hot top and nozzle and the limitation of the ingot shape specifications. At the same time, continuous casting billet has advantage of large-scale production and its cost is only 70% of the mould casting ingot. Forge-welding of the stacked continuous casting billets not only reduces the cost of forging, but also widens the application range of continuous casting billet and improves the added value of the product.

5. Clean and stable manufacture of large section forgings can be achieved. Production of mould casting ingot is characterized by its variety and small batch. Meanwhile, it has much manual preparation work such as preparing moulds, runners and insulation material before pouring. At the same time, after pouring the hot top heating agent and covering agent will cause serious environmental pollution. Vacuum electron beam welding and forge welding are used on the stacked continuous casting billets. This process can be fully automated, which can not only improve the working environment, but also reduce the influence of human factors, so quality of the products will be more stable.

BRIEF DESCRIPTION OF THE DRAWINGS

FIG. 4 shows the process flow diagram of the present invention. It is included (a) cutting the continuous casting billet; (b) milling and smoothing the surfaces to be welded, exposing fresh metal and performing plasma cleaning; (c) sealing the interface around in a vacuum chamber by electron beam welding; (d) heating the billet in high temperature furnace; (e) using hydraulic press to upset the billet in a direction perpendicular to the to be welded interface; (f) when the upsetting reaches the expected position, keeping the pressure on the billet to make the defects completely welded; (g) returning the billet to the furnace for high temperature diffusion after upsetting; (h)~(i) three-dimensional forging to guarantee the billet's large deformation in each direction; (j) forging the billet to the final shape and size.

DETAILED DESCRIPTION OF PREFERRED EMBODIMENTS

Figure 4:
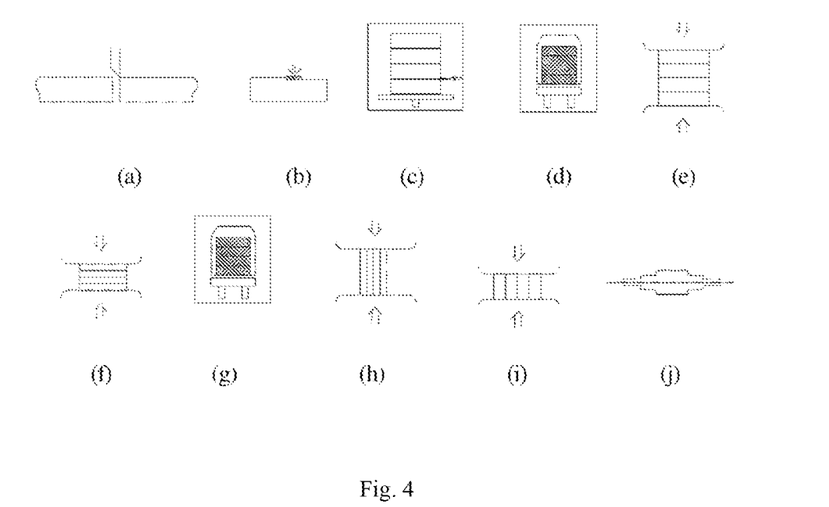

As shown in FIG. 4, in the present invention, the process flow of the method for preparing homogenizing forging by forge-welding stacked continuous casting billets is as follows:

(a) cutting the continuous casting billet; (b) milling and smoothing the surfaces to be welded, exposing fresh metal and performing plasma cleaning; (c) sealing the interface around in a vacuum chamber by electron beam welding; (d) heating the billet in high temperature furnace; (e) using hydraulic press to upset the billet in a direction perpendicular to the to be welded interface; (f) when the upsetting reaches the expected position, keeping the pressure on the billet to make the defects completely welded; (g) returning the billet to the furnace for high temperature diffusion after upsetting; (h) (i) three-dimensional forging to guarantee the billet's large deformation in each direction; (j) forging the billet to the final shape and size by traditional free forging process like upsetting, stretching, rounding, punching, broaching and core bar stretching.

The present invention is further illustrated by exemplary embodiment, comparative embodiment, and experimental embodiment.

Exemplary Embodiment 1

Using continuously casted method, the continuously casted slab billet with width 1200 mm and thickness 200 mm is casted. The steel is 25Cr2Ni4MoV and the chemical composition is listed in Table 1. This steel is commonly used for pressure vessel. Cutting the billet to a certain size, after machining and cleaning, sealing and welding the billets in the vacuum chamber and then forge it. The specific steps are as follows:

Table 1 measured chemical composition of 25Cr2Ni4MoV steal (mass percentage, %)

| | element | | | | | | | | |
|---|---|---|---|---|---|---|---|---|---|
| | C | Si | Mn | P | S | Cr | Ni | Mo | V |
| percentage | 0.21 | 0.039 | 0.27 | 0.005 | 0.005 | 1.64 | 3.46 | 0.39 | 0.095 |

A first step, cutting off the continuous casting billets according to a certain specification. Three pieces of 200× 450×300 mm continuous casting billets are cut and stacked together. Making the dimensions of the stacked billets as width=300 mm, length=450 mm, height=600 mm, which can be easily forged in three directions.

A second step, machining and cleaning the surface to be welded. The surface to be welded is processed by milling planer and cleaned by plasma in a vacuum chamber, which can guarantee the surface's high cleanliness and expose fresh metal.

Figure 2:
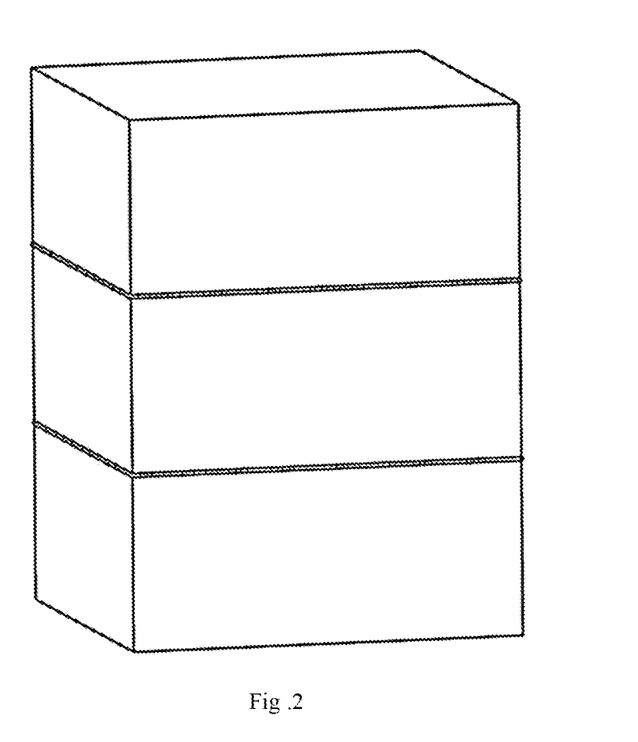
FIG. 2 shows in an exemplary embodiment of the present invention, the continuous casting billets are stacked and sealing welded.

A third step, sealing the billets by vacuum electron beam welding. The stacked billets are placed in the vacuum chamber and the interfaces between the billets are sealed around by electron beam welding. The welding depth is 10~50 mm (FIG. 2). A fourth step, heating the billets before forging. The sealed billet is sent to the heating furnace and the heating temperature is 1250° C.

Figure 3:
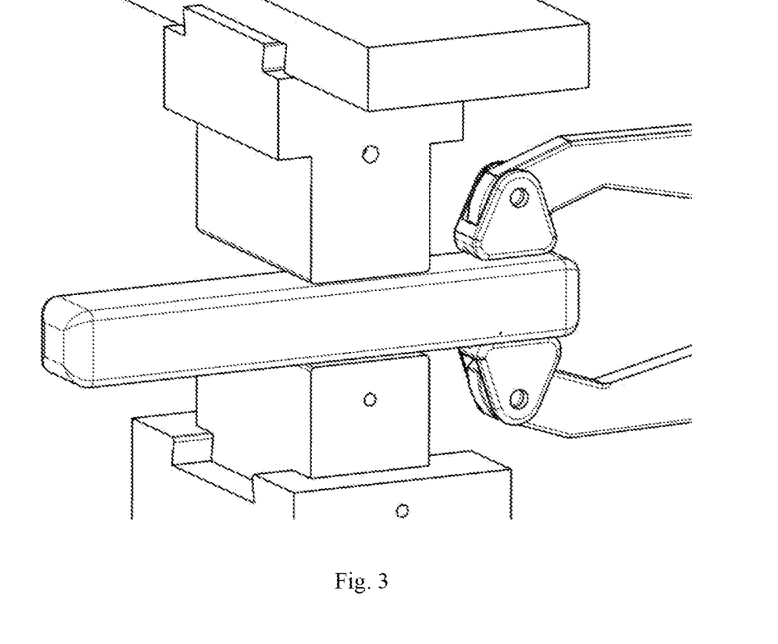
FIG. 3 shows in an exemplary embodiment of the present invention, the billets are being forged.

A Fifth step, upsetting and forge-welding the billets using a pressure dwelling forge welding method. Placing the heated billets on the operation platform of forging press and making the height direction of the billet vertical; upsetting the billets using upsetting plate in the direction of height (Z direction); upsetting is carried out in two steps: first, pressing the billets to reduce the total height of the billets by 10% and keep pressure on the billets for 5min; then continuing the upsetting until the total height of the billets is reduced by 50%, and keeping pressure on the billets for 10min (FIG. 3).

A sixth step, diffusion bonding the billets under a high temperature. The upset billets are sent back to the heating furnace and the heating temperature is 1250° C. The temperature holding time is 6 hours.

A seventh step, stretching the billets in the Y direction and deforming it to width=450 mm, length=600 mm and height=300 mm.

An eighth step, stretching the billet in the X direction and deforming it to width=600 mm, length=300 mm and height=450 mm.

A ninth step, stretching the billet in the Z direction and deforming it to width=300 mm, length=450 mm and height=600 mm.

A tenth step, forging the billet to have final shape and size, which is thickness=180 mm, length=1000 mm and width=1000 mm.

Comparative Embodiment 1

The material's chemical composition and final work piece size in comparative embodiment 1 are the same as that of exemplary embodiment 1. Conventional mould casting ingot and forging process are used in the comparative embodiment 1. The specific steps are as follows:

A first step, making ingot mould, chassis, hot top box and central casting pipe. The grey iron is used to produce ingot mould, chassis, hot tops box and central casting pipe for a 2-ton ingot. The hot top insulation board, mould powder, carbonized rice hull, heating agent and other auxiliary materials should be prepared.

A second step, assembling the ingot mould. Bricks are built on the chassis to make runner. The ingot mould and central casting pipe are set on the chassis, the hot top box is set on the ingot mould and the mould powder is hanged inside the ingot mould.

A third step, smelting and pouring. A 2 tons of steel is smelted and poured. After pouring, the carbonized rice hull is placed on the upper part of the hot top for heat preservation.

A forth step, demoulding. 5 hours after pouring, a steel ingot of Φ280×1000 mm can be got after demoulding.

A fifth step, cutting off. After cutting the hot top and nozzle, the billet can be got.

A sixth step, heating. The billet is put into the heating furnace and the heating temperature is 1250° C. The temperature holding time is 6 hours.

A seventh step, stretching the billet in the Y direction and deforming it to width=450 mm, length=600 mm and height=300 mm.

An eighth step, stretching the billet in the X direction and deforming it to width=600 mm, length=300 mm and height=450 mm.

A ninth step, stretching the billet in the Z direction and deforming it to width=300 mm, length=450 mm and height=600 mm.

A tenth step, forging the billet to have final shape and size, which is thickness=180 mm, length=1000 mm and width=1000 mm.

Comparative Embodiment 2

The material's chemical composition and final work piece size in comparative embodiment 2 are the same as that of exemplary embodiment 1. Conventional cladding rolling process is used in the comparative example 2. The specific steps are as follows:

A first step, cutting off the plurality of the continuous casting billets according to a certain specification 3 pieces of 200×450×300 mm continuous casting billets are cut and stacked together. Make dimensions of the stacked billets as width=300 mm, length=450 mm, height=600 mm.

A second step, machining and cleaning the surfaces of the billets to be welded. The surface to be welded is processed by milling planer and cleaned using alcohol or acetone.

A third step, welding the billets by vacuum electron beam welding to seal the billets. The stacked billets are placed in the vacuum chamber and the interfaces between the billets are sealed around by electron beam welding. The welding depth is 50 mm.

A fourth step, heating the billets before forging. The sealed billet is sent to the heating furnace and the heating temperature is 1250° C.

A fifth step, rolling the billet. The heated billet is placed on heavy plate rolling mill for rolling. The average reduction depth for each press is 30 mm. Both transverse rolling and longitudinal rolling are used. After rolling for 14times, the billet is rolled to the thickness of 180 mm, length of 1000 mm and width of 1000 mm.

Experimental Embodiment 1

Figure 5:
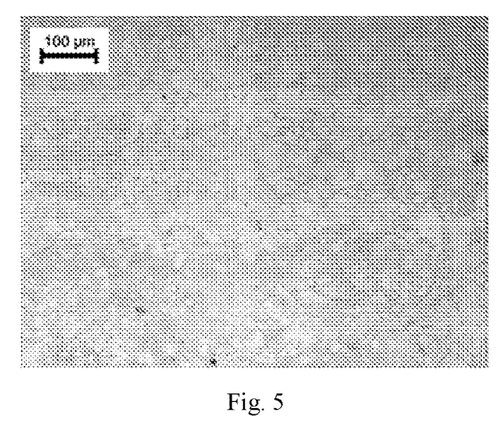
FIG. 5 shows in an exemplary embodiment of the present invention, the microstructure of the welded interface after forging.
Figure 6:
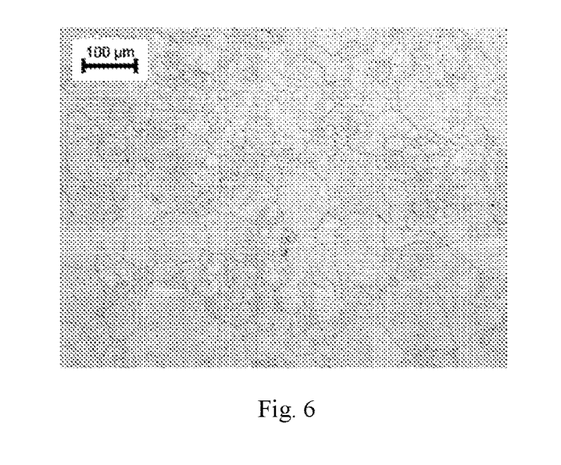
FIG. 6 shows in the comparative embodiment 1, the microstructure on the central area of the forged pieces forged from traditional ingot.
Figure 7:
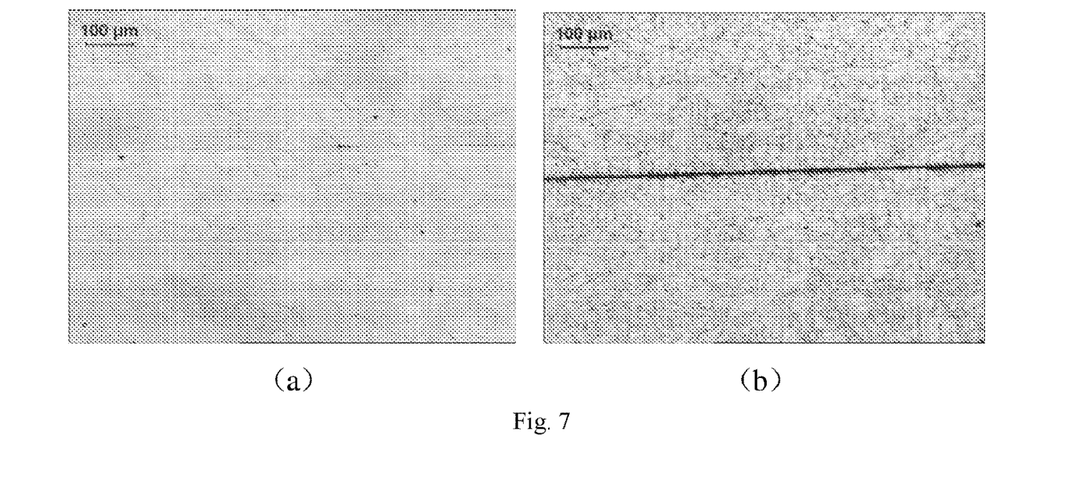
FIG. 7 shows in the comparative embodiment 2, the microstructure of the welded interface after cladding rolling. It is including, (a) the central area of the billet, (b) the edge region of the cladding rolled billet.

Forgings in exemplary embodiment 1, comparative embodiment 1 and comparative embodiment 2 are sawed in the center line. Specimens of welded interface area can be got and corroded by nitric acid in alcohol. The specific macrostructure is shown in FIGS. 5, 6 and 7. It can be seen from the figures that the microstructure of the forging using the method of stacked continuous casting billet forge welding of the present invention are basically the same as that of the forging using conventional forging method. No abnormal microstructure is found at the original interface position, while compared with conventional forging method, the method of stacked continuous casting billets forge welding of the present invention can improve material utilization rate by 30%. Meanwhile, the interface has not been fully roll welded at the center of the billet produced by continuous casting billets cladding rolling method (FIG. 7a). During the first several passes of the multiple passes rolling, there is shear stress at the edge of the billet interface, which will fracture the electron beam welding area and lead to the oxidation of the to be welded surface. After deformation, obvious interface structure exists, as shown in FIG. 7b.

The result of experimental embodiment shows that the present invention breaks through the conventional method of using mould casting steel ingot to make large forgings. Using vacuum cleaning and electron beam welding on continuous casting billets, and pressure dwelling and temperature dwelling method during forging, the interface is completely welded. Then three-dimensional forging is used in the subsequent upsetting and stretching process to disperse the welded interface, which makes the composition, microstructure and inclusion level of the interface area reach that of the matrix's level. The present invention can largely reduce the manufacturing cost, improve the material utilization rate and solve conventional ingot's problems of segregation, coarse crystal, inclusion, shrinkage cavity and porosity, so manufacturing of homogenized forgings can be achieved. In addition, the present invention can also be used for bonding different kinds of metals.

What is claimed is:

1. An additive forging method for preparing homogenized forged pieces, comprising:
   a first step, preparing a plurality of preformed billets;
   a second step, stacking the plurality of preformed billets and sealing the stacked billets by vacuum welding;
   a third step, heating the sealed billets before forging;
   a fourth step, forging and upsetting the heated billets under a pressure, then keeping the pressure on the billets;
   a fifth step, heating the billets and performing high temperature diffusion after upsetting;
   a sixth step, multidirectional forging the billets, and
   a seventh step, forging the billets to have final shape and size.

2. The additive forging method for preparing homogenized forged pieces of claim 1, wherein the first step comprises cutting off a plurality of billets according to a certain specification, then machining and cleaning surfaces of the plurality of billets to be welded.

3. The additive forging method for preparing homogenized forged pieces of claim 2, wherein the first step further comprises machining and smoothing the surfaces to be welded, then placing the plurality of billets in a vacuum chamber and performing vacuum plasma cleaning the surfaces to be welded so as to ensure high cleanliness of the surfaces and to expose fresh metal.

4. The additive forging method for preparing homogenized forged pieces of claim 2, wherein, when cutting off the billets, a width-to-length ratio of the plurality of billets is 2:3.

5. The additive forging method for preparing homogenized forged pieces of claim 2, wherein the first step further comprises machining and smoothing the surfaces to be welded, then placing the plurality of billets in a vacuum chamber and performing vacuum plasma cleaning the surfaces to be welded so as to ensure high cleanliness of the surfaces and to expose fresh metal, wherein, when cutting off the billets, a width-to-length ratio of the plurality of billets is 2:3.

6. The additive forging method for preparing homogenized forged pieces of claim 1, wherein, in the second step, the plurality of preformed billets are placed in a vacuum chamber and stacked.

7. The additive forging method for preparing homogenized forged pieces of claim 6, a total height of the stacked billets versus a width is 2:1, a ratio of width(X):length(Y):height(Z) is 2:3:4.

8. The additive forging method for preparing homogenized forged pieces of claim 6, wherein, in the second step, the plurality of preformed billets are stacked and interfaces between the billets are sealed around by electron beam welding in a vacuum chamber.

9. The additive forging method for preparing homogenized forged pieces of claim 8, wherein a welding depth is 10-50 mm.

10. The additive forging method for preparing homogenized forged pieces of claim 1, wherein the third step comprises heating the sealed billets before forging at a heating temperature of $0.85T_m$, wherein $T_m$ is a melting point of a material of the billets and a unit of $T_m$ is ° C.

11. The additive forging method for preparing homogenized forged pieces of claim 1, wherein in the fourth step comprises using the pressure to upset the heated billets in a direction perpendicular to surfaces to be welded, then keeping the pressure on the billets to make interfaces completely welded when the upsetting reaches an expected position.

12. The additive forging method for preparing homogenized forged pieces of claim 11, wherein the fourth step further comprises placing the heated billets on a forging machine and making a height direction of the billets vertical; upsetting the billets in the height direction (Z direction) perpendicular to the surfaces to be welded; wherein the upsetting is carried out in two steps: first, pressing the billets to reduce a total height of the billets by 10% and keeping the pressure on the billets for 5 min; then continuing the upsetting until the total height of the billets is reduced by 50%, and keeping the pressure on the billets for 10 min.

13. The additive forging method for preparing homogenized forged pieces of claim 1, wherein, in the fifth step, the upset billets are sent back to a heating furnace and heated to a temperature of $0.85T_m$ to ensure micro defects formed during forging to be healed completely by diffusion at a high heating temperature, wherein Tm is a melting point of a material of the billets and has a unit in ° C., and the heating temperature is kept for 20Th hours after the billets are uniformly heated, Th is a height after upsetting and has a unit in meters.

14. The additive forging method for preparing homogenized forged pieces of claim 1, wherein, in the sixth step, the multidirectional forging is used to disperse welded interfaces between the billets, making a composition and microstructure of the interface area to reach that of a matrix material.

15. The additive forging method for preparing homogenized forged pieces of claim 14, wherein, in the sixth step, a three-dimensional forging is used.

16. The additive forging method for preparing homogenized forged pieces of claim 15, wherein the three-dimensional forging comprises stretching the billets in a Y direction, stretching the billets in an X direction and then stretching the billets in a Z direction.

17. The additive forging method for preparing homogenized forged pieces of claim 16, wherein the three-dimensional forging further comprises upsetting the billets by 50% in the Y direction by a flat anvil, and after the billets are deformed to a certain dimension, stretching the billets in the X direction.

18. The additive forging method for preparing homogenized forged pieces of claim 16, wherein the three-dimensional forging further comprises upsetting the billets by 50% in the X direction by a flat anvil, and after the billets are deformed to a certain dimension, stretching the billets in the Z direction.

19. The additive forging method for preparing homogenized forged pieces of claim 1, wherein the method can be used for bonding a same kind of metals or bonding different kinds of metals.

* * * * *